March 7, 1961
C. B. MERRY
2,973,822
MOBILE PACKER
Filed June 6, 1958
2 Sheets-Sheet 1
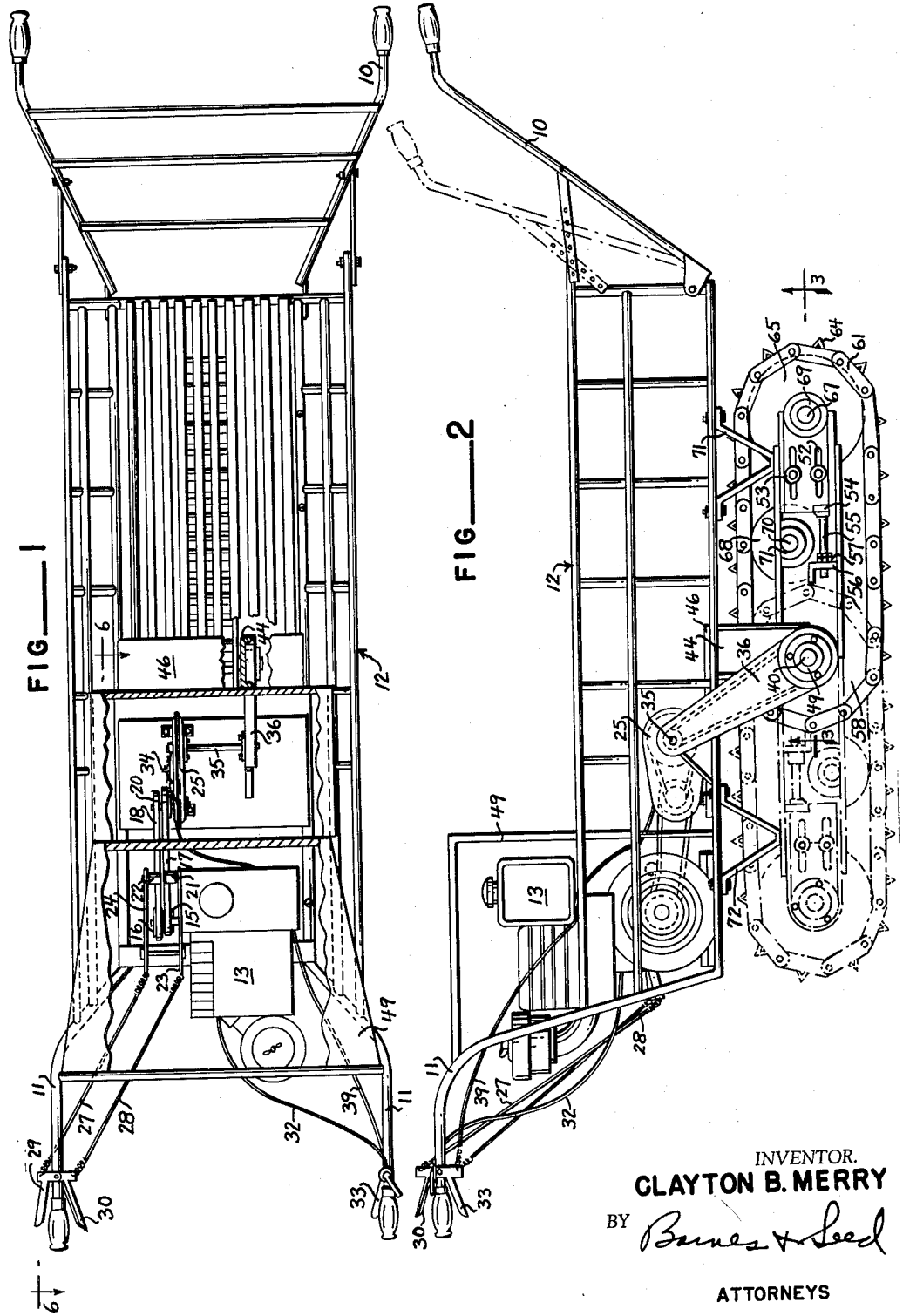
INVENTOR.
CLAYTON B. MERRY
BY Barnes & Leed
ATTORNEYS March 7, 1961 C. B. MERRY 2,973,822
MOBILE PACKER
Filed June 6, 1958 2 Sheets-Sheet 2
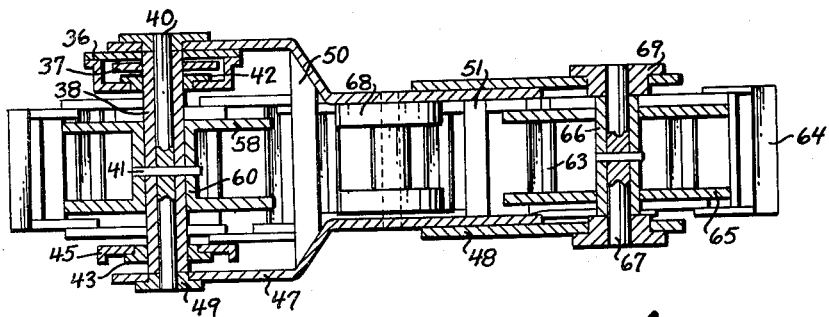
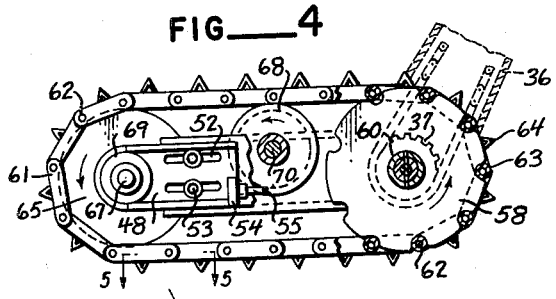
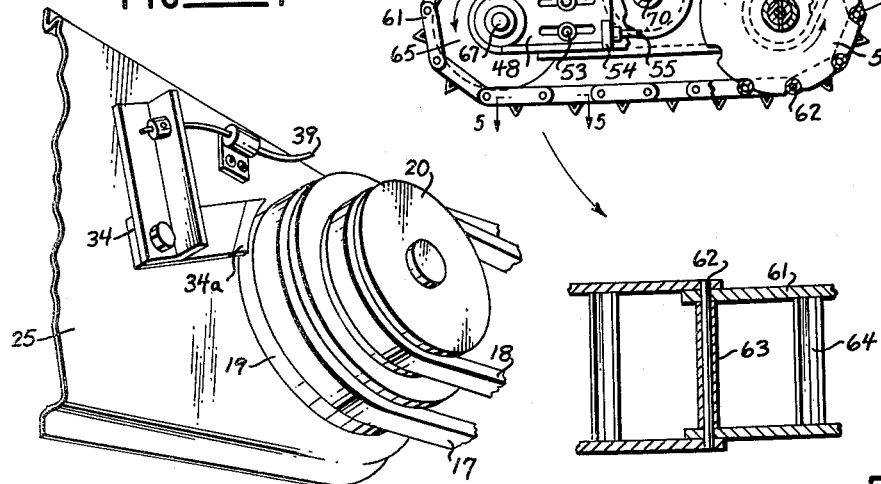
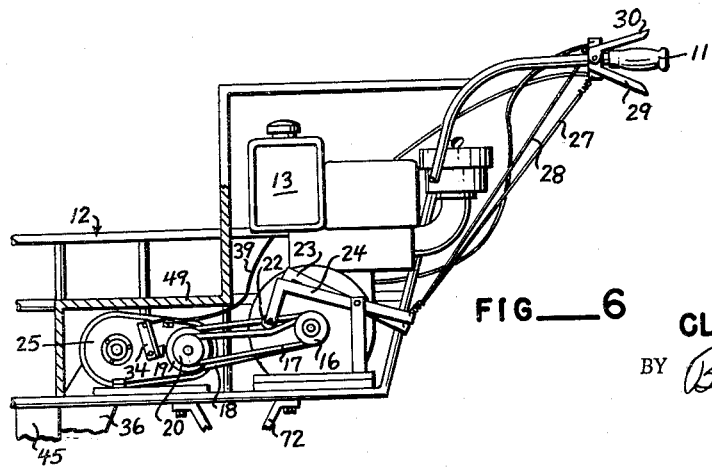
INVENTOR.
CLAYTON B. MERRY
BY Barnes & Seed
ATTORNEYS Patented Mar. 7, 1961

2,973,822
MOBILE PACKER
Clayton B. Merry, Star Rte., Leavenworth, Wash.

Filed June 6, 1958, Ser. No. 740,482

5 Claims. (Cl. 180—9.5)

The present invention relates to an improved self-propelled packer for transporting supplies, game, tools and equipment at walking speed over rough terrain and narrow trails while controlled with ease by two operators walking therewith at fore and aft stations.

As important objects the invention aims to provide a mobile packer which is of durable and economical construction, will maintain positive traction even in extremely adverse "off the trail" conditions, and will safely and expeditously carry full loads up and down unusually steep grades.

With yet additional objects and advantages in view which, with the foregoing, will appear and be understood in the course of the following description and claims, the invention consists in the novel construction and in the adaptation and combination of parts hereinafter described and claimed.

In the accompanying drawings:

Figure 1 is a top plan view of my packer with part of the basket broken away and the rear position of the track is shown in phantom.

Fig. 2 is an elevational view of the packer as viewed from the right side.

Fig. 3 is an enlarged horizontal sectional view taken as indicated by the line 3—3 of Fig. 2.

Fig. 4 is a side elevational view of the track assembly of my packer, taken from the left side thereof as a vantage point, and with parts broken away and shown in vertical section.

Fig. 5 is a detail view illustrating one of the track articulations and taken along the line 5—5 of Fig. 4.

Fig. 6 is a fragmentary vertical sectional view taken along the line 6—6 of Fig. 1.

Fig. 7 is an elevational detail view of the brake arrangement.

Referring to the drawings it is seen that my packer has pairs of tubular handles 10—10 and 11—11 extending fore and aft, respectively, from an elongated basket-like frame for carrying a load and is propelled by an underlying endless track. Mounted on the rear of this frame is a motor 13 whose output shaft 14 receives a pair of pulleys 15, 16. Belts 17, 18 transfer power from the latter to pulleys 19, 20 and are selectively tensioned by clutch rollers 21, 22 which are journaled at the free ends of levers 23, 24 pivoted on the frame 12. The pulleys 15, 19 and 16, 20 are given different size ratios for different speed outputs to a reduction chain case 25, the input shaft 26 of which carries the pulleys 19, 20. Control cables 27, 28 connect the clutch levers 23, 24 with high and low speed control levers 29, 30 which are pivotally mounted on the left of the rear handles 10. The right rear handle carries a throttle control lever 31 which connects by a cable 32 with the throttle of the engine 13. It also has a brake control lever 33 which is connected by a cable 39 to one arm of a spring-loaded bell crank 34 pivotally mounted at the center of the chain case 25. The other arm of the crank 34 has its free end serving as a brake shoe 34a and is arranged to be urged against the rim of the pulley 19.

The output shaft 35 from the chain case 25 traverses the frame 12 to become the input shaft for a second reduction chain case 36 which slopes downwardly below the frame at the right side thereof and is welded to the lower bias edge of a depending channel member 44 of trapezoidal shape. Sprocket 37 at the lower end of the latter chain case is mounted on the right end of a tubular axle section 38 which receives an axle extension 40 and is locked thereto by a pin 41. The axle section 38 is journaled in bearings 42, 43 mounted in the lower ends of the inner wall of the case 36 and a channel member 45. This member and the opposed member 44 have weld connections at the top with a cross-plate 46 of the frame 12. A stepped sheet metal plate 49 covers the engine 13 and the portion of the drive therefrom which is above the bottom of the frame.

The axle extension 40 is made of such a length that it will project endwise beyond the channel members 44, 45 so as to have its projecting ends serve as trunnions for receiving bearings 49 mounted in the root or primary end of a swing-frame. The side rails of the latter each have primary and secondary telescoping sections 47, 48 of general channel section with their flanges directed outwardly. In top view the primary sections 47 extend from their axle mounting for about half of their length and then jog inwardly. Cross-braces 50, 51 interconnect the rail sections 47, the first at the jog therein and the other spaced lengthwise from the jog. Each of the secondary side rail sections 48 have a pair of vertically spaced longitudinal slots 52 for receiving locking bolts 53 which pass through holes in the primary sections 47. At its inner end each section 48 has a lug 54 from which an adjustment screw 55 extends lengthwise from a weld connection through a pierced ear 56 provided by the related rail section 47. A pair of nuts 57, one for adjustment and the other for locking purposes, are threaded on each screw 55 to bear against the outer face of the respective ear 56.

The swing-frame carries a track assembly whose driving wheel has sprocket wheels 58 near its ends radiating from a hub sleeve 60 through which the tubular axle section 38 extends and has a driving connection by the pin 41. At each articulation of the track links 61 a cross-pin 62 passes through the inner links at both sides of the track and is welded to the outer links of the particular articulation. Rollers 63 are journaled on the link pins and hold the inner links of the track against their respective outer links. The valleys between the sprockets of the wheels 58 are perforce properly spaced and shaped to receive the end portions of the rollers 63. Grousers 64 which may be of a general V-shape cross-connect each pair of the links 61.

Located at the swinging end of the track assembly is an idler wheel having wheel plates 65 spaced apart in conformance with the spacing of the sprocket wheels 58 and having a radius corresponding to the valleys of the latter so as to be engaged by the rollers 63. The wheel plates 65 are mounted on a hub sleeve 66 which receives a shaft 67 journaled in bearings 69 provided near the outer end of the rail sections 48.

It will be apparent that the swing-frame and track assembly can be swung to occupy either the front full line position or rear phantom line position shown in Fig. 2. The front position is preferred when the packer is travelling down steep grades and the rear position for travel thereup. Either position is good for normal terrain. When the track is in the rear position the upper run thereof is tensioned rather than the lower ground engaging run as is the case when the track is in the front operating position, and accordingly, I provide a central idler somewhat similar in construction to the idler at the track's swinging end in that it has wheel plates 68 mounted at the ends of a hub sleeve which receives a shaft 70. This shaft is journaled in bearings 71 mounted in the narrowed portions of the primary rail sections 47. The wheel plates 68 have sufficient width and are so located as to engage the inner and outer articulating links 61 at respective sides of the track run which is at the bottom when the track occupies the rear position. Thus, it will keep this run from bowing upwardly at the center out of ground engagement.

The load to be carried is preferably laced to the frame 12 and placed, if possible, so that the center of gravity of the frame and motor plus load is directly above the axle. In operation the packer is usually handled by two operators, one grasping the front handles 10 and the other the rear handles 11. The rear operator normally starts and stops the engine and operates the control levers on the rear handles. With his left hand he selectively presses levers 29, 30 to engage the high or low speed clutch, depending upon the slope and nature of the terrain, and with his right hand he operates the throttle control lever 31 and brake lever 33. The forward operator usually faces forwardly and selects the trail as he walks along. On steep down grades the track may often be free wheeled along without power. In order for this to occur the shaft 26 which carries the pulleys 19, 20 must of course be free to turn. Thus a retarding of the shaft 26 by brake pressure of the shoe 35 on the pulley 19 responsive to manual pressure applied to the lever 33 gives the operator control of the speed of free wheeling.

As before mentioned, the front and rear positions of the track are preferably selected when the packer is to be propelled down and up, respectively, a steep grade while either position is usually equally as good for normal terrain. To shift the track between these positions it may be necessary to stop the packer and lay it on its side while swinging the swing-frame about the ends of the axle section 40. As the packer moves along the track of course swings up and down to follow the rises and falls of the ground surface. To keep the track grousers 64 from engaging the underside of the frame 12, the latter is provided with front and rear depending stops 71, 72 arranged to be contacted by the top of the secondary side rail section 48 when the swing-frame is in its front and rear positions, respectively, before the grousers in the upper run of the track can swing up against the frame.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In a mobile packer, an elongated load carrying frame assembly, a rigid swing-frame journal-mounted at one of its ends beneath said frame assembly for swinging the other end of the swing-frame about a swing axis between alined forwardly and rearwardly directed positions, an elongated endless rotary track assembly giving continuous ground support for said frame assembly, said track assembly being operatively carried by said swing-frame with the upper run and lower ground engaging run thereof when said other end of the swing-frame is directed forwardly being arranged to become the lower ground engaging run and upper run, respectively, when said other end is directed rearwardly, and drive means carried by said frame assembly and operatively associated with said track assembly for driving the latter at said swing axis to propel the packer forwardly regardless of the position of the swing-frame.

2. In a mobile packer, an elongated load carrying frame assembly having two laterally spaced journal supports depending therefrom intermediate its ends, a swing-frame operative beneath said frame assembly and having laterally spaced opposed side rails with a common end journaled at said supports for swinging the other end of the side rails in unison substantially 180 degrees about a swing axis between forwardly and rearwardly directed positions, an elongated endless rotary track assembly giving continuous ground support for said frame assembly, said track assembly being operatively carried by said swing-frame between its side rails with the upper run and lower ground engaging run thereof when said other end of the side rails is directed forwardly being arranged to become the lower ground engaging run and upper run, respectively, when said other end is directed rearwardly, and drive means carried by said frame assembly and operatively associated with said track assembly for driving the latter at said swing axis to propel the packer forwardly regardless of the position of the swing-frame.

3. In a mobile packer, an elongated load carrying frame assembly with a motor mounted thereon near the rear thereof, a swing-frame journal-mounted at one of its ends beneath said frame assembly and forwardly of said motor for swinging the other end of the swing-frame about a swing axis between alined forwardly and rearwardly directed positions, an elongated endless rotary track assembly giving continuous ground support for said frame assembly, said track assembly being operatively carried by said swing-frame with the upper run and lower ground engaging run thereof when said other end of the swing-frame is directed forwardly being arranged to become the lower ground engaging run and upper run, respectively, when said other end is directed rearwardly, said track assembly including a drive sprocket at said swing axis, and drive means operatively associated with said motor and sprocket for driving the latter to propel the packer forwardly regardless of the position of the swing-frame.

4. In a mobile packer, an elongated load carrying frame assembly, a swing-frame journal-mounted at one of its ends beneath said frame assembly for swinging the other end of the swing-frame about a swing axis, an elongated endless rotary track assembly giving continuous ground support for said frame assembly, said track assembly being operatively carried by said swing-frame with the upper and lower runs thereof moving above and below, respectively, the upper and lower extremities of the swing-frame, stop means on the underside of said frame assembly and in the swing path of the swing-frame for engagement by the latter to thereby prevent the upper run of the track assembly from swinging into contact with the frame assembly, and drive means carried by said frame assembly and operatively associated with said track assembly for driving the latter at said swing axis to propel the packer forwardly.

5. In a mobile packer, an elongated load carrying frame assembly, a swing-frame journal-mounted at one of its ends beneath said frame assembly for swinging the other end of the swing-frame about a swing axis between forwardly and rearwardly directed positions, an elongated endless rotary track assembly giving continuous ground support for said frame assembly, said track assembly being operatively carried by said swing-frame with the upper run and lower ground engaging run thereof when said other end of the swing-frame is directed forwardly being arranged to become the lower ground engaging run and upper run, respectively, when said other end is directed rearwardly, front and back stop means on the underside of said frame assembly and in the swing path of the swing-frame for engagement by the latter to define the front and back limits, respectively, of said swing path and thereby prevent the track assembly from swinging into contact with the frame assembly, and drive means carried by said frame assembly and operatively associated with said track assembly for driving the latter at said swing axis to propel the packer forwardly regardless of the position of the swing-frame.

References Cited in the file of this patent

UNITED STATES PATENTS

| | | |
|---|---|---|
| 2,740,484 | Montana | Apr. 3, 1956 |
| 2,827,972 | West | Mar. 25, 1958 |